United States Patent
Czech et al.

(10) Patent No.: US 11,837,743 B2
(45) Date of Patent: Dec. 5, 2023

(54) BATTERY WITH A FIRE PROTECTION DEVICE AND MOTOR VEHICLE

(71) Applicant: AUDI AG, Ingolstadt (DE)

(72) Inventors: Marvin Czech, Ingolstadt (DE); Yixin Yuan, Beijing (CN)

(73) Assignee: AUDI AG, Ingolstadt (DE)

( * ) Notice: Subject to any disclaimer, the term of this patent is extended or adjusted under 35 U.S.C. 154(b) by 265 days.

(21) Appl. No.: 17/083,777

(22) Filed: Oct. 29, 2020

(65) Prior Publication Data

US 2021/0143383 A1 May 13, 2021

(30) Foreign Application Priority Data

Nov. 7, 2019 (DE) .......................... 102019130097.5

(51) Int. Cl.
*H01M 10/658* (2014.01)
*H01M 50/233* (2021.01)
(Continued)

(52) U.S. Cl.
CPC ......... *H01M 50/24* (2021.01); *H01M 10/658* (2015.04); *H01M 50/233* (2021.01);
(Continued)

(58) Field of Classification Search
CPC .. H01M 50/24; H01M 50/20; H01M 2200/10; H01M 2220/20; H01M 10/658
See application file for complete search history.

(56) References Cited

U.S. PATENT DOCUMENTS 3,656,340 A * 4/1972 Ball .................... G01B 7/18
73/769
8,277,965 B2 * 10/2012 Hermann ............ H01M 10/653
429/185
(Continued)

FOREIGN PATENT DOCUMENTS

DE 102012019676 A1 4/2014
DE 102012222876 A1 6/2014
(Continued)

OTHER PUBLICATIONS

Long, R. T., Kahn, M., Mikolajczak, C., White, K. (2011). Lithium-Ion Batteries Hazard and Use Assessment. United States: Springer New York. (Year: 2011).*

(Continued)

*Primary Examiner* — Cynthia H Kelly
*Assistant Examiner* — Tarik J Phillip
(74) *Attorney, Agent, or Firm* — Maier & Maier, PLLC

(57) ABSTRACT

A battery with a fire protection device, wherein the battery includes a plurality of battery cells and a battery housing, wherein a respective battery cell is arranged in an interior space of the battery housing. The fire protection device includes a composite layer with a thermal insulation layer and with a protective layer arranged on the insulation layer, wherein the composite layer is arranged on a battery housing interior side facing the interior space of the battery housing, and the insulation layer is arranged as an intermediate layer between a surface of the battery housing interior side and the protective layer and is protected by the protective layer (Continued)

against a gas and/or flame stream exiting the respective battery cell in the event of damage, whereby its thermally insulating properties are maintained.

13 Claims, 1 Drawing Sheet

(51) Int. Cl.
| | |
|---|---|
| *H01M 50/392* | (2021.01) |
| *H01M 50/383* | (2021.01) |
| *H01M 50/282* | (2021.01) |
| *H01M 50/278* | (2021.01) |
| *H01M 50/276* | (2021.01) |
| *H01M 50/24* | (2021.01) |
| *H01M 50/249* | (2021.01) |
| *H01M 50/342* | (2021.01) |

(52) U.S. Cl.
CPC ....... *H01M 50/249* (2021.01); *H01M 50/276* (2021.01); *H01M 50/278* (2021.01); *H01M 50/282* (2021.01); *H01M 50/3425* (2021.01); *H01M 50/383* (2021.01); *H01M 50/392* (2021.01); *H01M 2200/10* (2013.01); *H01M 2220/20* (2013.01)

(56) References Cited

U.S. PATENT DOCUMENTS

| | | | | |
|---|---|---|---|---|
| 2005/0079408 | A1* | 4/2005 | Hirano | ................ H01M 10/613 429/174 |
| 2008/0302544 | A1* | 12/2008 | Eskind | .................. A62C 2/065 169/51 |
| 2010/0086844 | A1* | 4/2010 | Mehta | ................ H01M 10/653 429/163 |

FOREIGN PATENT DOCUMENTS

| | | | | |
|---|---|---|---|---|
| DE | 102014012568 | A1 | 3/2016 | |
| DE | 102016100223 | A1 | 7/2017 | |
| EP | 3 493 293 | A1 | 6/2019 | |
| EP | 3 641 013 | A1 | 4/2020 | |
| JP | 5378670 | B2 * | 12/2013 | |
| JP | 5378670 | B2 * | 12/2013 | ............ H01M 2/105 |
| WO | 2017/139826 | A1 | 8/2017 | |

OTHER PUBLICATIONS

Machine translation of JP 5378670B2 originally published to Hajime et al. on Dec. 2013 (Year: 2013).*

Machine translation JP-5378670-B2 as taught by Hajime (Year: 2013).*

German Search Report dated Jul. 2, 2020 in corresponding German Application No. 102019130097.5; 10 pages; Machine translation attached.

* cited by examiner

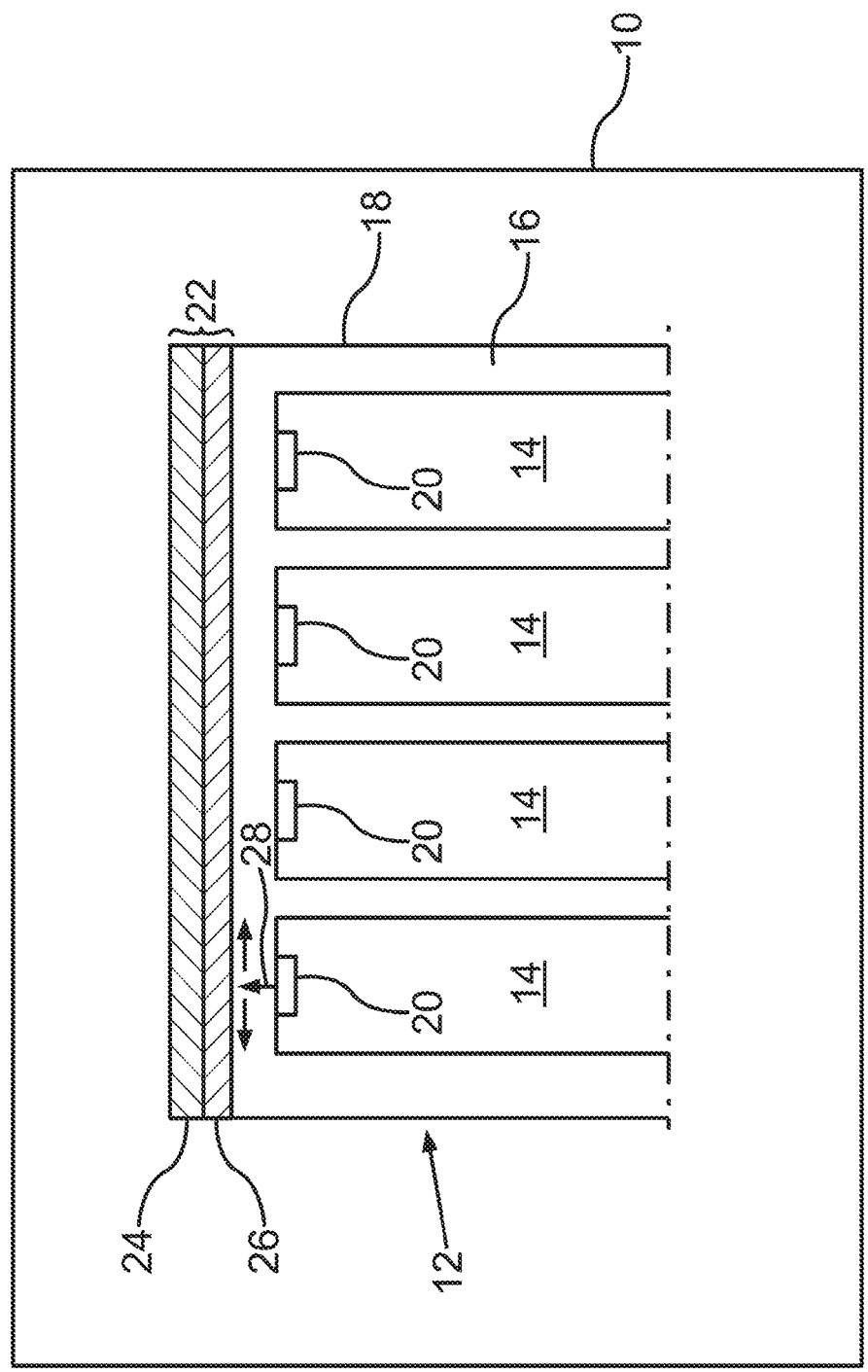

BATTERY WITH A FIRE PROTECTION DEVICE AND MOTOR VEHICLE

FIELD

The disclosure relates to a battery with a fire protection device and to a motor vehicle with such a battery. The battery according to the disclosure includes a plurality of battery cells, wherein a respective battery cell is arranged in an interior space of a battery housing of the battery.

BACKGROUND

A battery in the sense of the disclosure is preferably a so-called high voltage battery, that is to say a battery which is designed to provide an electrical voltage in the range of more than 60 volt, in particular in the range of several 100 volt. Such batteries are preferably used in at least partially electrically driven motor vehicles, where they provide electrical driving energy for driving the motor vehicle. The high voltages in the above-mentioned range required for this purpose are achieved in that the individual battery cells of the battery are interconnected in an electrically conductive manner An individual battery cell here preferably provides a voltage in the range between 3.5 and 4 volt, in particular 3.6 volt. A respective energy density of such a battery cell is in particular influenced by or dependent on a respective cell chemistry of the battery cell. In the event of damage in such a battery cell or more precisely in the galvanic cell of such a battery cell, for example, an internal short circuit, then, based on the chemical reaction resulting therefrom, a gas mixture, the composition of which is dependent on the respective cell chemistry, collects in the interior of a respective battery cell housing. This damage-induced chemical reaction as a rule leads moreover to intense heating of the affected battery cell in comparison to a standard operating temperature of the battery cell.

From the prior art, various approaches are known for thermally insulating such battery cells which are damaged and heating up. Thus, WO 2017/139826 A1 and DE 10 2012 222 876 A1 each provide, for this purpose, a thermally insulating coating for battery cells, which consists at least partially of an intumescent material, that is to say a material which is capable of foaming by exposure to heat. For this purpose, the foamable coating encloses a cell group or a cell stack at least partially or is arranged between individual battery cells as thermally insulating layer.

DE 10 2016 100 223 A1 also describes a fire protection material which is capable of swelling with heat and which can be used in a vehicle battery.

Finally, DE 10 2012 019 676 A1 discloses a rechargeable battery transport container with a flexible case. The described rechargeable battery transport container comprises a hose-like waste gas line which is made of multiple layers. One of the layers comprises a heat-resistant textile, and an additional layer comprises, for example, an intumescing or intumescent material.

SUMMARY

As described above, in a damaged battery cell, an accumulation of gas or a gas evolution can occur. Due to the gas evolution, an elevated battery cell interior pressure compared to a predetermined operating pressure builds up within the damaged battery cell, which can lead to gas exiting the battery cell in the form of a gas and/or flame stream. The known solutions mentioned in fact enable an effective thermal insulation of a damaged battery cell or of an entire cell stack; however, in the case of such a described gas and/or flame stream exit from the battery cell housing of the damaged battery cell into an interior space or an interior of a battery housing enclosing the respective battery cell, disadvantageously no additional, in particular mechanic, protective measures are provided.

The underlying aim of the invention is to provide an improved fire protection device for a battery of the type described at the start. In particular, a fire protection is to be implemented here, which allows an effective thermal insulation of the damaged battery cell(s), even in the case of a damaged-induced gas and/or flame stream exit as described above, and thus maintains an integrity of a battery housing at least for predetermined time interval after the occurrence of a damage event.

The disclosure is based on the finding that, while a layer made of an intumescent material does provide an effective heat insulation, it provides little or no resistance to a mechanical stress. In particular, such a layer exhibits no or only limited mechanical resistance to a damage-induced gas and/or flame stream exit.

A battery with a fire protection device is provided. The battery according to the above-described type comprises a plurality of battery cells and a battery housing. A respective battery cell is here arranged in an interior space of the battery housing. In other words, the respective battery housing surrounds or encloses the plurality of battery cells. In other words, the battery cells are isolated by the battery housing with respect to an environment surrounding the battery housing or adjoining the battery housing or to an outside area. Preferably, the battery housing is sealed or closed off in an air-tight manner. The battery housing is preferably made of a metal, in particular aluminum.

The fire protection device according to the disclosure includes a composite layer with a thermal insulation layer and with a protective layer arranged on the insulation layer. The composite layer can be designed, for example, in the form of a mat. The composite layer is arranged, according to the invention, on a battery housing interior side facing the interior space of the battery housing. According to the invention, the insulation layer is arranged as an intermediate layer between a surface of the battery housing interior side and the protective layer. In other words, the fire protection device according to the invention comprises a stack or a stacked layer sequence consisting of an insulation layer and a protective layer. The arrangement of insulation layer and protective layer according to the invention wherein the insulation layer is designed as an intermediate layer between the surface of the battery housing interior side and the protective layer advantageously leads to the insulation layer being protected by the protective layer from a gas and/or flame stream exiting the respective battery cell in the event of damage. In an advantageous manner, the thermally insulating properties of said battery are maintained thereby.

Thus, an advantage is achieved that the thermal insulation layer is mechanically protected from a gas and/or flame stream. Thus, a gas and/or flame stream is advantageously prevented from destroying or burning through or breaking through the thermal insulation layer and thus destroying its thermally insulating properties. The "damage event" mentioned here is characterized in particular in that a gas and/or flame stream exits at least one battery cell.

The invention also includes embodiments resulting in additional advantages.

An advantageous embodiment provides that the respective battery cell has a predetermined breakthrough site arranged on a side of the battery cell arranged facing the composite layer. Preferably, in the even of damage, the gas and/or flame stream first exits from the at least one predetermined breakthrough site and hits the composite layer. Such a breakthrough site can be established by means of a so-called rupture disk. In other words, the respective battery cell preferably comprises a predefined weak point or breaking point which, in the case of a damage-induced elevated battery interior pressure, yields before other areas of the respective battery cell housing break through or yield. Thereby, advantageously, a damage-induced exiting gas and/or flame stream can be channeled. In other words, a respective site on a battery cell housing where the gas and/or flame stream will exit is known. According to the embodiment described here, this site (or precisely the predetermined breakthrough site) is arranged with respect to the composite layer in such a manner that an exiting gas and/or flame stream hits the composite layer. The composite layer thus does not have to be arranged covering the whole area along the surface of the battery housing interior side, but it can instead advantageously and as needed be arranged in certain areas. Accordingly, each area faces a respective breakthrough site. Thereby, savings of material and/or weight of the composite layer can advantageously be obtained.

Depending on a respective cell chemistry, the gas and/or flame stream can transport particles. As a rule, such a particle has a diameter of less than 1 millimeter. A gas and/or flame stream loaded with such particles can act like a sand blast and accordingly has great potential for mechanical destruction. In order to prevent the gas and/or flame stream and/or particles transported in the gas and/or flame stream from being distributed in the interior space of the battery housing, a preferred development of the invention provides that the gas and/or flame stream is guided to a catch container of the fire protection device. According to the embodiment described here, a form and/or orientation of the surface and/or a pressure gradient in the interior space of the battery housing is/are designed to guide the gas and/or flame stream along a predetermined path. The guiding can occur, for example, by ribs and/or channels formed along the surface. In the case in which the catch container is located outside of the battery housing, a pressure gradient between the interior space and the catch container can advantageously be formed, which advantageously assists in the guiding. The pressure gradient is generated, for example, in that the battery housing is opened as a result of damage and is no longer closed off in an airtight manner. According to the embodiment described here, the composite layer is arranged along the predetermined path. In other words, the composite layer is arranged at the sites of the surface, where or along which the gas and/or flame stream can hit or flow. Such a site or critical spot can be located, for example, on a curvature of the surface. Due to this targeted arrangement of the composite layer at respective critical spots, an unnecessary or excessive application of the composite layer can advantageously be avoided. In other words, the measures according to which, on the one hand, the gas and/or flame stream is guided along a predetermined path and, on the other hand, the composite layer is arranged along this path, work together synergistically.

According to an advantageous development, the insulation layer is made of an intumescent material. In other words, the insulation layer is made of a material which is capable of swelling with heat. A temperature occurring in the event of damage here preferably triggers an intumescence-induced volume increase of the insulation layer. Advantageously, the selection of the material of the insulation layer thus ensures that the volume increase is triggered only at the damage-induced temperature. The insulation layer can at least partially consist of an epoxy or a polymer. Intumescent materials are sufficiently known to the person skilled in the art and can be selected by him/her as needed.

Preferably, the protective layer is made of a glass fiber fabric and/or a metallic scrim or knitted fabric and/or of a metallic film. Advantageously, the protective layer matches the form of the intumescent layer during the expansion but does not impede the expansion. At the same time, the protective layer generates the described mechanical protection effect for the insulation layer. In other words, the intumescent insulation layer and the protective layer described here work together synergistically in the composite layer. The protective layer or fiber layer or film layer thus protects the intumescent material which in turn protects the battery housing from the damage-induced temperature. As described at the beginning, the battery housing can preferably consist of an aluminum. As is known, aluminum loses its intrinsic strength starting at a temperature of approximately 240 degrees Celsius. It is known that melting of aluminum starts at approximately 660 degrees Celsius. The composite layer accordingly is preferably designed to limit a battery housing temperature to at most 240 degrees Celsius, so that the intrinsic strength of the aluminum housing is maintained.

The protective layer is preferably made of a fine-mesh glass fiber fabric, wherein a coarseness of the protective layer is preferably selected in such a manner that the above-mentioned particles cannot accumulate. In other words, the protective layer is preferably designed so that elevations and recesses, in particular of microscopic type, along a protective layer surface have respective diameters or radii that are below an average particle diameter. This is achieved preferably by using the mentioned metallic film.

According to an advantageous embodiment, it is provided that the protective layer is integrated in a material of the insulation layer. For example, the protective layer can be formed as a glass fiber fabric which can be pressed into a surface of the insulation layer. In other words, the glass fiber fabric can be pressed onto the insulation layer in such a manner that material of the insulation layer passes at least partially through meshes or holes of the glass fiber fabric. This results in the advantage of a simplified installation of the composite layer, since no individual layers need to be processed.

Preferably, the insulation layer has a thickness of 0.5 to 1 millimeter, in particular 0.6 millimeters.

The gas and/or flame stream as a rule has a damage-induced temperature, which is influenced by a cell chemistry, of 600 to 1100 degrees Celsius, in particular of 840 degrees Celsius.

In the event of damage, a battery cell interior pressure as a rule has a value of five to ten bars, in particular of eight bars, wherein, upon reaching the damage-induced battery cell interior pressure, the predetermined breakthrough site bursts. As described above, the composite layer is spatially arranged at least opposite the breakthrough site or at least in an area opposite the breakthrough site. Alternatively, it can be provided that the insulation layer of the composite layer completely lines the battery housing, whereby only the protective layer is arranged in the area of a respective breakthrough site.

In addition, the invention relates to a motor vehicle with a battery.

The invention also includes developments of the motor vehicle according to the invention, which have features as already described in connection with the developments of the battery according to the invention. For this reason, the corresponding developments of the motor vehicle according to the invention are not described again here.

The motor vehicle according to the invention is preferably designed as an automobile, in particular as passenger car or truck, or as a passenger bus or a motorcycle.

The invention also includes the combination of the features of the described embodiments.

Below, embodiment examples of the invention are described.

BRIEF DESCRIPTION OF THE DRAWING(S)

FIG. 1 shows a diagrammatic view of a motor vehicle with a battery.

DETAILED DESCRIPTION

The embodiment examples explained below are preferred embodiments of the invention. In the embodiment examples, the described components of the embodiments in each case represent individual features of the invention to be considered independently of one another, which in each case also further develop the invention independently of one another. Therefore, the disclosure should also include combinations of the features of the embodiments other than those represented. Moreover, the described embodiments can also be supplemented by others of the already described features of the invention.

Identical reference numerals in the FIGURES denote in each case functionally equivalent elements.

The FIGURE shows a diagrammatic representation of a motor vehicle 10 with a battery 12. The FIGURE shows a diagrammatic representation of a motor vehicle 10 with a battery 12. The battery 12 shown in the FIGURE comprises, for example, four battery cells 14. The battery cells 14 are arranged in an interior space 16 of a battery housing 18 of the battery 12. A respective battery cell 14 has a predetermined breakthrough site 20. In the embodiment example shown in the FIGURE, a respective breakthrough site 20 is arranged on a side of the respective battery cell 14 facing a composite layer 22. The composite layer 22 of the FIGURE includes an insulation layer 24 and a protective layer 26.

In the FIGURE, it is shown, as an example, that a damage event is occurring in the battery cell 14 arranged on the far left. Accordingly, as described above, gas evolution is occurring in the battery cell 14. The resulting increasing battery cell interior pressure of the battery cell 14 leads to bursting of the breakthrough site 20. As a result, a flame and/or gas stream 28 exits from the breakthrough site 20 according to the arrows shown in the FIGURE. As described, the protective layer 26 protects the insulation layer 24 from the mechanical effect of the exiting gas and/or flame stream 28, so that the thermally insulating properties of the insulation layer 24 of the composite layer 22 are maintained.

The coating or composite layer 22 is thus preferably formed by a combination of an intumescing fire protection coating or insulation layer 24 and an additional fabric layer or protective layer 26 (concretely, glass fiber fabric). The fabric layer has the function of braking the gas and/or flame stream 28 exiting in the event of damage, whereby a destruction of the fire protection coating or insulation layer 24 is advantageously prevented. In other words, the intumescent fire protection coating also ensures the fire protection property of the composite layer 22 in spite of the exiting of the gas and/or flame stream 28.

Overall, the examples show how an enhanced fire protection coating can be provided by the invention.

The invention claimed is:

1. A battery with a fire protection device, wherein the battery comprises:
   a plurality of battery cells, wherein each battery cell of the plurality of battery cells has a predetermined breakthrough site comprising a predefined weak point that is configured to burst after a damage event occurs in the respective battery cell and after each battery cell interior pressure exceeds a damage-induced battery cell interior pressure threshold of between five to ten bars; and
   a battery housing, wherein a respective battery cell is arranged in an interior space of the battery housing, wherein the fire protection device further comprises:
   a composite layer with a thermal insulation layer and with a protective layer arranged on the insulation layer, wherein the composite layer is arranged on a battery housing interior side facing the interior space of the battery housing, and the insulation layer is arranged as an intermediate layer between a surface of the battery housing interior side and the protective layer and is protected by the protective layer against a gas and/or flame stream exiting the respective battery cell in the event of damage, whereby its thermally insulating properties are maintained, each predetermined breakthrough site is arranged on a side of the respective battery cell facing the composite layer, and wherein, after the damage event, the gas and/or flame stream first exits from each predetermined breakthrough site into the interior space and hits the composite layer.

2. The battery according to claim 1, wherein a form and/or orientation of the surface and/or a pressure gradient in the interior space is/are designed to guide the gas and/or flame stream along a predetermined path, wherein the fire protection device further comprises:
   a catch container for catching the gas and/or flame stream guided toward the catch container and/or particles transported in the gas and/or flame stream, and the composite layer is arranged along the path.

3. The battery according to claim 1, wherein the insulation layer is made of an intumescent material, wherein a temperature occurring in the event of damage triggers an intumescence-induced volume increase of the insulation layer.

4. The battery according to claim 1, wherein the protective layer is made of a glass fiber fabric and/or a metallic scrim or knitted fabric and/or of a metallic film.

5. The battery according to claim 1, wherein the protective layer is integrated in a material of the insulation layer.

6. The battery according to claim 1, wherein the insulation layer has a thickness of 0.5 to 1 millimeter.

7. The battery according to claim 1, wherein the gas and/or flame stream has a temperature of 600 to 1100 degrees Celsius, which is dependent on the chemistry of each battery cell.

8. The battery according to claim 2, wherein the insulation layer is made of an intumescent material, wherein a temperature occurring in the event of damage triggers an intumescence-induced volume increase of the insulation layer.

9. The battery according to claim 2, wherein the protective layer is made of a glass fiber fabric and/or a metallic scrim or knitted fabric and/or of a metallic film.

10. The battery according to claim 3, wherein the protective layer is made of a glass fiber fabric and/or a metallic scrim or knitted fabric and/or of a metallic film.

11. The battery according to claim 2, wherein the protective layer is integrated in a material of the insulation layer.

12. The battery according to claim 3, wherein the protective layer is integrated in a material of the insulation layer.

13. The battery according to claim 4, wherein the protective layer is integrated in a material of the insulation layer.

* * * * *